No. 720,843. PATENTED FEB. 17, 1903.
W. C. PETERS.
HOOK OR ATTACHMENT DEVICE.
APPLICATION FILED JULY 28, 1902.
NO MODEL.

Witnesses:
Inventor,
Walter C. Peters.
by Herbert W. Jenner.
Attorney

THE NORRIS PETERS CO., PHOTO-LITHO., WASHINGTON, D. C.

No. 720,844. PATENTED FEB. 17, 1903.
W. C. RAFFERTY.
DEPRESSION POSITION FINDER.
APPLICATION FILED MAY 11, 1897.
NO MODEL. 6 SHEETS—SHEET 2.

Fig. 2.

WITNESSES:
INVENTOR
William C. Rafferty
BY
ATTORNEYS

No. 720,844. PATENTED FEB. 17, 1903.
W. C. RAFFERTY.
DEPRESSION POSITION FINDER.
APPLICATION FILED MAY 11, 1897.
NO MODEL. 6 SHEETS—SHEET 3.

No. 720,844. PATENTED FEB. 17, 1903.
W. C. RAFFERTY.
DEPRESSION POSITION FINDER.
APPLICATION FILED MAY 11, 1897.
NO MODEL. 6 SHEETS—SHEET 4.

WITNESSES: INVENTOR
William C. Rafferty
BY
ATTORNEYS

No. 720,844. PATENTED FEB. 17, 1903.
W. C. RAFFERTY.
DEPRESSION POSITION FINDER.
APPLICATION FILED MAY 11, 1897.
NO MODEL. 6 SHEETS—SHEET 5.

WITNESSES:
D. A. Hayward
Jno. R. Taylor

INVENTOR
William C. Rafferty
BY
Dyer & Driscoll
ATTORNEYS

No. 720,844. PATENTED FEB. 17, 1903.
W. C. RAFFERTY.
DEPRESSION POSITION FINDER.
APPLICATION FILED MAY 11, 1897.

NO MODEL. 6 SHEETS—SHEET 6.

*Fig. 12.*

UNITED STATES PATENT OFFICE.

WILLIAM C. RAFFERTY, OF GOVERNORS ISLAND, NEW YORK.

DEPRESSION-POSITION FINDER.

SPECIFICATION forming part of Letters Patent No. 720,844, dated February 17, 1903.

Application filed May 11, 1897. Serial No. 636,124. (No model.)

*To all whom it may concern:*

Be it known that I, WILLIAM C. RAFFERTY, a citizen of the United States, residing at Governors Island, in the county and State of New York, have invented a certain new and useful Depression-Position Finder, of which the following is a specification.

The object of this invention is to mechanically locate the position of a distant object by polar coördinates from any point which is elevated above the position of the object, the degree of such elevation being known. The polar coördinates are the distance or range of the object from the point named and the angle made by the line joining these two with any known line, such as the north and south line.

This invention provides mechanism for obtaining both the range and the angle and at the same time enables these results to be read by the operator with rapidity and accuracy.

The invention further comprehends mechanism for providing in locating the distant object for the influence due to refraction, the rise and fall of tide, and the contour of the surface of the earth, as will be hereinafter specifically set forth.

The invention is illustrated in the accompanying drawings, in which—

Fig. 12 is a detached detail view illustrating a modification to be hereinafter referred to.

It is important that the device of this invention be so supported as to be readily leveled and maintained in that position. In the drawings it is shown as mounted upon a circular foundation, although it is not important that the foundation should have such form.

Figure 2:
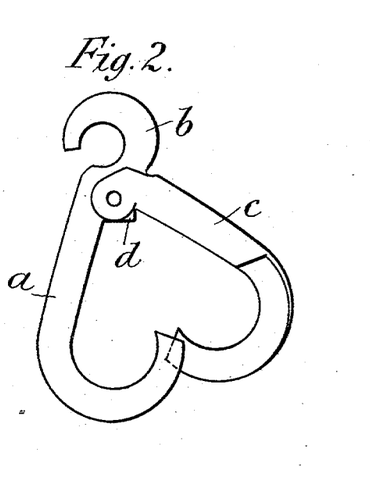
Fig. 2 is a side elevation, partly in section.
Figure 10:
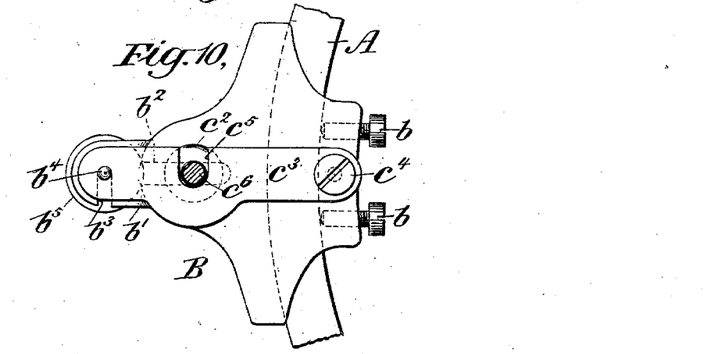

Referring particularly to Fig. 2, A designates the circular foundation, having in this instance three brackets B, secured to the upper portion thereof. These brackets are illustrated on an enlarged scale in Fig. 10. As there shown, they are secured to the foundation A by means of screws $b$. $b'$ designates an outwardly-projecting arm provided intermediate of its ends with a groove or channel $b^2$ and at or near its free end with a recess $b^3$, through which passes a set-screw $b^4$, provided, preferably, with a milled head $b^5$. A leveling-screw C coacts with each of the brackets B. As here shown, it is provided with a screw-threaded portion $c$, an enlarged and preferably exteriorly-milled portion $c'$, and the head $c^2$, the lower extremity of which engages with the groove or channel $b^2$. $c^3$ designates a spring-plate secured at the inner end to the bracket B by means of screw $c^4$ and provided at its outer end with a perforation with which engage the threads upon the screw $b^4$. By means of said screw the plate $c^3$ is adjusted toward and from the outwardly-extending arm $b'$ of the bracket B. Intermediate of its ends the plate $c^3$ is provided with a recess $c^5$, within which is embraced the reduced portion $c^6$ of the head $c^2$. It will be understood that the office of the plate $c^3$ is to hold said head firmly in engagement with the groove or channel $b^2$ of the bracket-arm $b'$. When it is desired to free the leveling-screw C, it is only necessary to ease the tension of the screw $b^4$ and swing the plate $c^3$ so that its recess $c^5$ shall no longer engage the reduced portion $c^6$ of the head of the leveling-screw. The plate $c^3$ will carry with it the screw $b^4$, which, owing to the swinging of said plate, will carry said screw out of the recess $b^3$ and its milled head $b^5$ therefore out of engagement with the under side of the outwardly-extending portion $b'$ of the bracket B. As above indicated, the three leveling-screws and their coacting mechanism are the same in construction and operation.

D designates the supporting-frame, provided with outwardly-extending arms $d$, the function of which will be presently described. This supporting-frame is provided with threaded perforations $d'$, formed in the outwardly-extending portions $d^2$ of the frame D, with which engage the threaded portions $c$ of the leveling-screws C. Since the supporting-frame D carries the mechanism hereinafter described, it is obvious that the whole may be quickly and reliably leveled by means of the screws C. The frame D is provided with a central aperture $d^3$, to which is secured, preferably by means of bolts $d^4$, a sleeve $d^5$, which receives the pivot E. The lower end of the sleeve $d^5$ is provided with a bearing $d^6$, having a screw $d^7$, coacting with a screw $d^8$, secured to the lower end of the pivot E.

F designates a ring provided in its upper surface with an annular slot $f$ and upon its periphery with teeth $f'$. This ring F is supported by means of the outwardly-extending arms $d$ of the frame D. It will of course be understood that the exact shape herein described of the support D is immaterial and has been adopted chiefly for convenience and to decrease the weight of the device as a whole.

Figure 8:
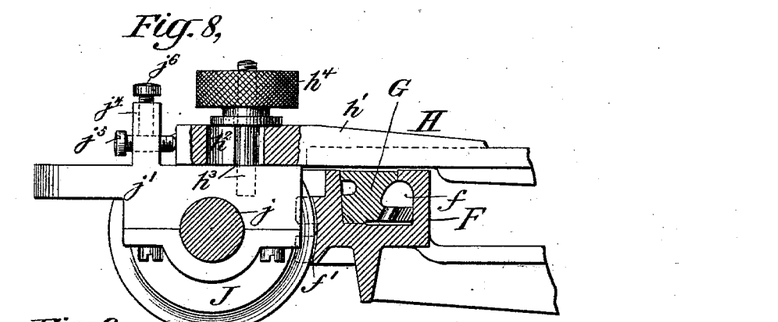
Figs. 8, 9, and 10 are enlarged detail views, the first two being partly in section, illustrating adjusting mechanism to be hereinafter specifically described.
Figure 9:
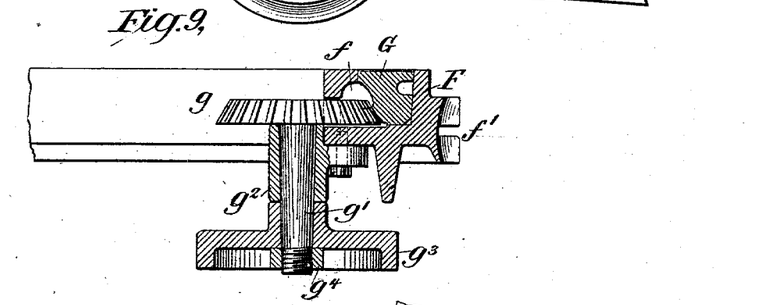

G designates a graduated ring or annulus mounted in the slot $f$ of the ring F and having movement therein. This ring or annulus G (shown in detail in Fig. 9) is provided, at or near its lower edge in the present instance, with teeth with which engage corresponding teeth formed upon a pinion $g$, mounted upon a shaft $g'$. This pinion and its shaft are supported in a bearing $g^2$, and the end of said shaft terminates in a milled headed screw $g^3$, to which said shaft is secured by the nut $g^4$. As shown in Figs. 8 and 9, the upper surface of the ring or annulus G is depressed below the corresponding surface of the ring F, and its under surface rests in the bottom of the slot $f$, formed in the latter ring. It will thus be seen that the ring or annulus G has movement within the slot $f$ entirely independent of any movement of the ring F and that this movement is governed by the pinion $g$.

Figure 1:
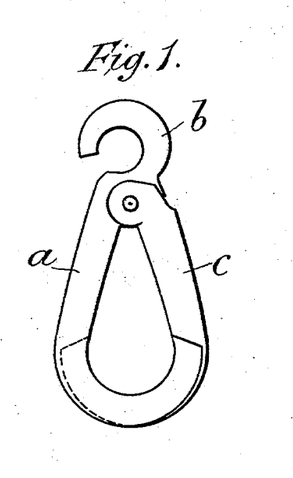
Figure 1 is a plan view of the position-finder.

The graduated ring or annulus G forms what is termed the "main limb" of the device. The upper limb consists of a plate H, centrally supported upon and secured to the center E. This upper limb or plate is shown in plan in Fig. 1. Its ends are provided with roller-bearings I. As illustrated in Figs. 1 and 2, the latter consists of brackets $i$, secured to the ends of the plate H and in each of which are mounted rollers $i'$, the pivots of which are adjustable by means of screws and jam-nuts $i^2$ $i^3$. The rollers $i'$ bear upon the inner portion of the upper surface of the ring F, as shown in Fig. 2. By this construction I provide for the ready movement of the upper limb or plate H upon said ring. The upper limb H is adapted to be moved upon its center either by an abrupt movement where considerable distance is to be covered or by fine and graduated movement for the purpose of close calculation. In the former case its movement is independent of the teeth on the periphery of the ring F. In the latter case the movement is imparted through the medium of said teeth. The mechanism by which these results are accomplished is shown particularly in Figs. 1 and 8. It consists, as here shown, of a worm J, adapted to engage with the teeth $f'$ upon said ring F and adapted to be rotated by hand. The worm J is controlled by a shaft $j$, both being mounted in the bracket $j'$. The latter is pivoted to the outwardly-extending portion $h$ of the plate H by means of pivot $j^2$.

$j^3$ designates the center bearing, by means of which one end of the shaft $j$, carrying the worm J, is mounted. The outwardly-extending portion $h'$ of the plate H is provided with a slot $h^2$, through which projects the screw $h^3$, secured to the bracket $j'$. The upper end of this screw above the portion $h'$ is provided with a nut $h^4$ for clamping the portion $h'$ and the bracket $j'$ together. The bracket $j'$ is provided with an upwardly-extending portion $j^4$, through which passes adjusting-screw $j^5$ and jam-screw $j^6$, the functions of each of which will be obvious.

When it is desired to move the upper limb or plate H by means of the worm, the latter is brought into engagement with the teeth $f'$ and the bracket supporting the worm is clamped in that position in the manner just described. If, however, it were desired to move the plate a considerable distance, as when leveling the instrument, the operator may disengage the worm from the ring F by unclamping the portion $h'$ and the bracket $j'$—in other words, by loosening the nut $h^4$. The bracket may then be swung away from the ring F and out of engagement with the teeth of the carriage.

H' designates an index secured to the upper limb or plate H and coacting with the graduations on the ring or annulus G.

The free end of the shaft $j$ of the worm J is provided with a graduated hand-wheel K, so arranged as to turn said shaft $j$ or to turn independently of said shaft. This is best illustrated in Fig. 1. As indicated in dotted lines in said figure, the free end of the shaft $j$ is tapered, and the wheel K is provided with a correspondingly-tapered bearing. The extreme end of the shaft $j$ is preferably threaded and provided with a nut $k$, by means of which the wheel may be rigidly secured to the shaft $j$. When it is desired to turn the wheel K independently of the shaft $j$, (which is the case under certain conditions to be hereinafter referred to,) nut $k$ may be unscrewed, and the wheel will be free to revolve. When it is desired that they shall move together, the nut is simply screwed against the face of the wheel K.

$k'$ designates a pointer or index secured at one end to the bracket $j'$. Its free end coacts with a graduation K' on the periphery of the wheel K. The scale K' in the present instance is in two parts, the graduations on each part representing sixty minutes. One complete turn of the wheel when the worm turns with it will through the medium of the latter move the plate H two degrees over the scale G' on the ring or annulus G. It is desirable that one part of the scale K' should be differentiated from the other, since, as hereinafter explained, it is designed that one part of said scale shall be used in conjunction with certain of the graduations upon the scale G', the other part being used in conjunction with the remaining graduations upon said scale. I therefore prefer, where a two-part scale is used upon the wheel K, to color one part or to provide it with a semicircular black mark, such as the mark $k^3$, as shown in Fig. 1. It is not important that the degree-marks upon the scale G' be characterized by two different colors or other indicia or that the minute-scale K' on the wheel K be in two parts, as I may, if desired, divide the marks upon the scale G' into three sorts, each sort being differentiated from another by a different color, and the same thing may be done with respect to the scale K' upon the wheel K, said scale being provided with three groups of graduations, each group distinguishable from another group and designed to be used with the corresponding sort of graduations upon the scale G'. If so graduated, the wheel K when rigidly secured to the shaft $j$ would move the index H' the distance of three degrees over the scale G'.

Figure 3:
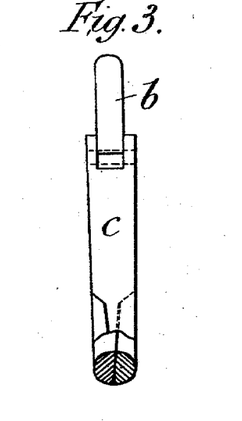
Fig. 3 is an end view, partly in section, of a portion of the apparatus, comprising chiefly the telescope and its adjusting medium.
Figure 4:
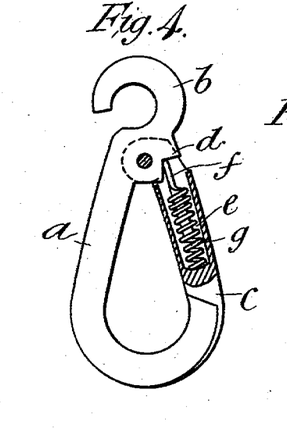
Fig. 4 is a plan view of a graduated range-disk shown in section in Fig. 3 and a portion of its coacting mechanism.
Figure 11:
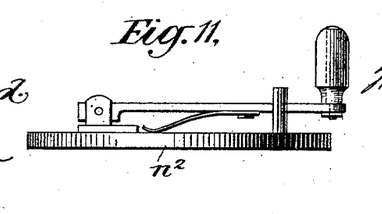
Fig. 11 is a side view of the actuating-pinion shown in plan in Fig. 1.

Turning now to the mechanism coacting directly with the telescope, L designates a vertical guide provided with rabbets $l$, one of which in the present instance is adjustable toward and from the other by means of screws $l'$. This guide is supported by arms $l^2$, the lower ends of which are secured upon the plate H in any suitable manner. Within this guide operates a screw-box M, provided in its interior with the female screw-shaft $m$. $m'$ designates a vertical screw-shaft provided over a portion of its length with male thread $m^2$, engaging with the female thread $m$. The lower end of the screw-shaft is mounted in a center bearing $m^3$, as shown in Fig. 3. To the lower portion of the screw-shaft $m'$ is secured in any suitable manner the range-disk N, the periphery of which is provided with teeth $n'$, with which engage corresponding teeth formed on the periphery of pinion $n^2$. The latter pinion is provided with a turning-handle. (Shown in detail in Fig. 11.) The upper surface of the range-disk N (shown in detail in Fig. 4) is provided with a spiral groove $n$, and along the edge of said groove are marked graduations indicating distance and bearing relation to the screw-shaft and to the upward movement of the screw-box M, caused by said screw-shaft. This graduation has relation to the changing angle of depression of the telescope which results from the operation of bringing the horizontal hair into coincidence with a particular portion of the distant object and compensates for the variation in the angle of depression due to the curvature of the earth's surface and also to the variation in this angle of depression due to refraction of the atmosphere.

Figures 4, 5, 6, 7:
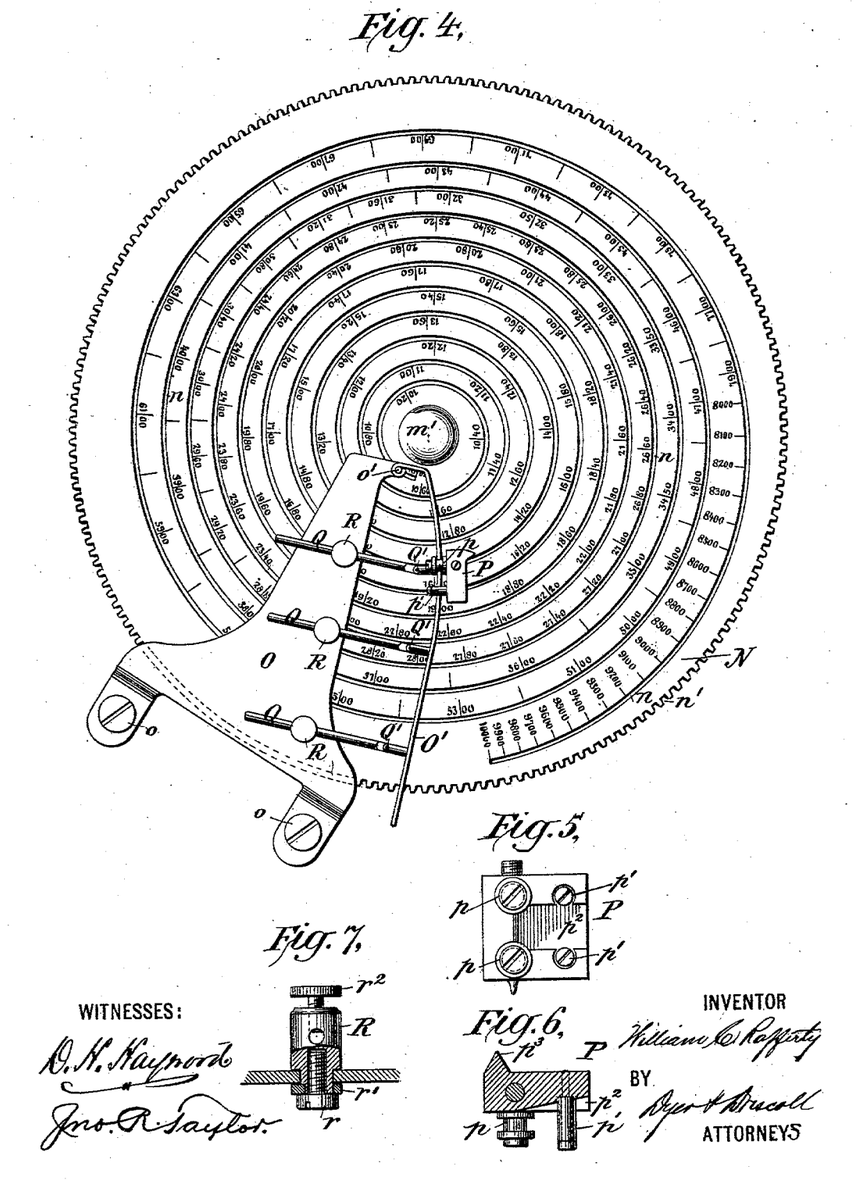
Figs. 5 and 6 are enlarged detail views illustrating the moving index shown in Fig. 4.
Fig. 7 is an enlarged detail view, partly in section, of one of the adjusting-posts shown in Fig. 4.
Figure 5:
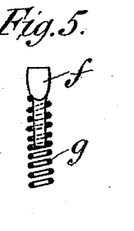

Passing for a moment the vertical movement of the screw-box M and its object and turning to the mechanism coacting immediately with the range-disk N, O designates a plate secured at its ends to the upper limb H, preferably by means of screws $o$. This plate extends inwardly toward the screw-shaft $m'$ and is provided at or near its inner end with a leaf-spring O', the end of which is pivoted at $o'$ upon said plate. This spring is provided with the movable index-carriage P. (Shown in detail in Figs. 5 and 6.) As here illustrated, this consists of a block provided with four rollers $p$ and $p'$. The rollers $p$ are provided with grooves of such dimension as to engage with the edges of the leaf-spring O'. The inner surface of the block is preferably provided with a recess $p^2$ to facilitate moving the block upon the spring when the latter is curved. The carriage P is provided with a pointed index $p^3$ to indicate upon the scale on the disk the reading to be taken. Q designates adjusting-rods pivoted at Q' to projections on the inner side of the leaf-spring O'. These adjusting-rods pass through perforations in the binding-posts R. (Shown in detail in Fig. 7.) Since it is essential that the posts R should have a limited rotary movement upon the plate O, provision is made for that end by securing said posts through the medium of screws $r$ and washers $r'$. The adjusting-rods Q are secured in position in the perforations in the posts by means of set-screws $r^2$. It will thus be seen that the leaf-spring O' may be given any desired curvature and clamped in that position by means of the adjusting-rods. Of the latter there may be any number. I have shown three of such rods in Fig. 4.

Figure 12:
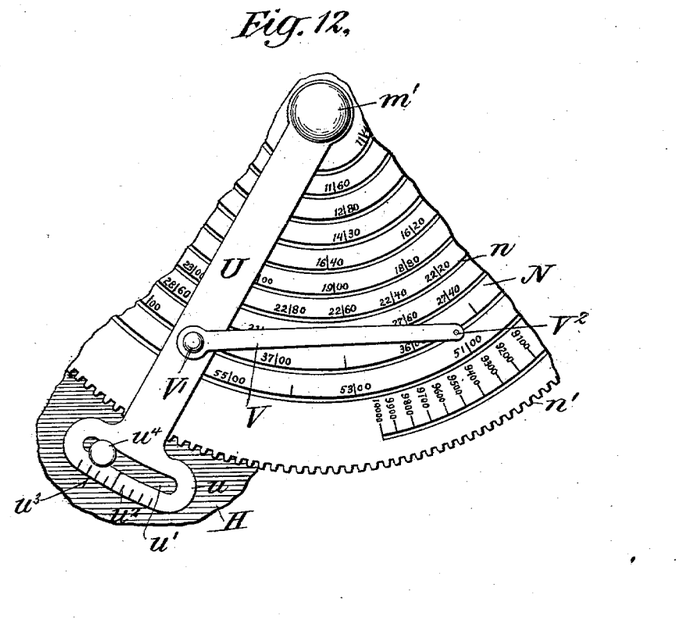

In Fig. 12 I have shown a modification of the apparatus last described, the same consisting of a radial arm U, pivoted upon the screw-shaft $m'$ and provided at its free end with an enlarged head $u$, having elongated slot $u'$. This head is provided with a scale or graduation $u^2$, coacting with the mark or other indication $u^3$ upon the upper limb or plate H. $u^4$ designates a set-screw passing through the slot $u'$ and received in a threaded perforation in the plate H. V designates an index-arm or follower, pivoted at V' upon the radial arm U and provided at its outer end with a pin $V^2$ of such dimension as to follow in the spiral groove $n$. When such device is used, the reading is taken at the point where the pin $V^2$ comes to rest.

Turning again to the screw-box M, S designates an outwardly-projecting arm secured to said screw-box and having mounted upon it a bracket $s$, adjustable upon said arm S and capable of being clamped thereto by screw $s'$. The bracket $s$ is grooved at $s^2$ and is provided with an index $s^3$. It will be apparent that the bracket and arm have movement in a vertical plane in coincidence with that of the screw-box M.

T designates a telescope. This may be of any desired construction. It is mounted upon the bar T', the outer end of which is pivoted upon the arm $t$, secured upon the upper limb or plate H.

$t'$ designates a spirit-level secured to the bar T'. The inner end of the bar T' is provided with a beveled edge $t^2$, coacting with the groove $s^2$ in the bracket $s$. Said bar is provided at a point adjacent to said beveled portion with a graduation with which the index $s^3$ upon the bracket $s$ coacts.

The operation of the device is as follows: As stated in the preamble, the finder is designed to be located on an elevation, the height of that elevation being known. It is first oriented, and this is done by means of the scale or graduation on the outer surface of the ring or annulus G, which scale or graduation is numbered from "1" to "360" degrees. As will be readily understood, when the device is oriented the line passing through "0" to "180" degrees of this graduation will run north and south. The facility with which my device may be oriented is of importance. Thus if the direction of a certain fixed point relatively to the point of location of the device is known it is only necessary to direct the telescope upon that point. The ring G may then be turned so that the index H' will point to the number of degrees indicating, approximately, the direction of the distant object. It will be observed that the scale G', employed upon the ring or annulus G, is provided with black marks indicating alternate degrees. In other words, each mark represents one degree, and the white space between two marks represents another. After sighting through the telescope the ring G is turned so that the index H' will point to a figure on said ring representing, approximately, the position of the distant object in degrees and parts of a degree. The remaining adjustment is effected by the hand-wheel K and worm J, the operation of which corrects the indication by the index H', so that it shall point to that part of the graduation indicating accurately the position of the distant object, not only in degrees, but in parts of a degree. Thus if the azimuth of the distant object upon which the telescope is directed be one hundred and eighty-eight degrees and thirty minutes the ring G is turned, by means of the pinion $g$, so as to bring the index H' opposite a point upon said ring indicating this reading—that is, if one of the black marks represents one hundred and eighty-eight degrees the ring is turned until the index shall be near the middle of the black mark. The hand-wheel K is now revolved independently of the shaft $j$ to such a point that the index $k'$ will indicate, according to the scale on the wheel adjacent to the black mark $k^3$ thereon, thirty minutes. The hand-wheel is then made fast to the shaft $j$ and turned back to zero. This, through the operation of the worm, will move the index over the ring a distance representing thirty minutes. If such movement carries the index beyond the edge of the black mark indicating one hundred and eighty-eight degrees, the ring G is again turned, by means of the pinion $g$, so that the index shall coincide with the edge of that mark. The hand-wheel is then again operated until the index $k'$ indicates thirty minutes, which operation, causing a corresponding movement of the upper limb or plate H, will give the true indication by the index H' upon the scale on the ring G. The device is now oriented.

The instrument the operation of which has thus far been described is of great utility for the simple determination of azimuths and angles. If it be desired to obtain the angle between a distant object and the device relatively to the north and south line, it is only necessary to turn the hand-wheel K until the telescope has been brought to such a point as to bear upon that distant object. This will give a reading representing a line between the device and the distant object, and this line, in conjunction with the reading first obtained, will give the angle made by the second line with the first.

Suppose, now, that it is desired to determine accurately the position of a distant vessel, the device having been oriented, as above described. The hand-wheel K is turned so as to move the upper limb or plate H and its attached mechanism in such manner as to enable a sight to be taken through the telescope upon the vessel. Ordinarily the telescope will then be so arranged as that the vertical hair of the telescope will bear upon any determinative point of the vessel—for instance, the foremast—and the horizontal hair upon the water-line. This is accomplished not only by revolving the wheel K, so as to bring the telescope around to the proper direction, but also by the operation of the pinion $n^2$, which rotates the range-disk N, which in turn operates the screw-shaft $m'$ and elevates or depresses the end (in this instance the inner end) of the telescope. This operation causes the movement of the index-carriage in the groove $n$, so that when the horizontal hair of the telescope coincides with the water-line of the vessel a reading had upon the surface of the range-disk N at the point of the index $p^3$ will indicate the range. Also the reading upon the scale or graduation of the ring G at the point indicated by the index H' and that on the scale or graduation K' of the wheel K at the point indicated by the index $k'$ will represent the azimuth of the distant point.

The scale upon the bar T' indicates, in conjunction with the index $s^3$ on the bracket $s$, the height of the telescope above the water. The position of the bracket $s$ upon the arm S is changed in coincidence with changes in the tide, so that that graduation upon the scale indicated by the index $s^3$ will at all times represent the true elevation of the telescope above the water.

The graduations on the spiral groove $n$ in the range-disk N are so arranged as to compensate for the contour of the earth's surface and for normal refraction. Provision is made for compensating for abnormal refraction in the means for rotating and bending the leaf-spring O' and clamping it in position. The position of this spring is fixed by the position of several bench-marks of varying distances from the point of location of the device. When so arranged, it represents the variation of the actual water-surface from the water-surface as it exists under normal conditions. As a result of the manipulation described two indications are obtained, the first of which (obtained by the reading of the scale G' at the index H', giving degrees, and that of the scale K' at the index $k'$, giving parts of a degree) represents the azimuth of the distant object. The other indication is given by the reading on the range-disk N, and, as heretofore indicated, represents the distance of the object from the point of location of the device.

I wish it understood that I do not limit myself to the means shown and described for mounting the telescope with respect to the use of a fixed pivotal point at the outer end and a movable index at the inner end, as these instrumentalities may, as will be readily understood, be reversed without departing from the spirit of the invention. It will also be understood that the apparatus may be used for the purpose of ascertaining the range of a distant object without determining its position by polar coördinates. It may also be used for the purpose of determining the angle between two points, such as the angle between the point of location of the device and a distant object to any other and known line—such, for instance, as the north and south line.

I attach importance to the use of a spiral groove on a graduated range-disk which possesses the advantages, among others, that it permits the index to be moved radially with respect to the groove therein and to thus adjust according to the law of variation in range due to vertical change of a telescope, and, further, it permits the graduations to occupy a considerable space, and thus conduces to ease and accuracy of reading.

I claim—

1. A device for locating a distant point, comprising in combination a frame, an annulus movably mounted in said frame and carrying a scale, means for moving said annulus with respect to the frame, an upper limb pivotally movable with respect to the frame and said annulus, an index carried by said limb and coöperating with the scale on said annulus, and a sighting instrument having movement coincident with said limb, substantially as set forth.

2. A device for locating a distant point, comprising in combination a frame, means for leveling the same, an annulus movably mounted in said frame and carrying a scale, means for moving said annulus with respect to the frame, an upper limb pivotally movable with respect to the frame and said annulus, an index carried by said limb and coöperating with the scale on said annulus, and a sighting instrument having movement coincident with said limb, substantially as set forth.

3. A device for locating a distant point, comprising in combination a frame, an annulus movably carried by said frame and having a scale or graduations thereon, separate adjusting devices for moving the annulus with respect to said frame, an upper limb, an index carried thereby coöperating with the scale on the annulus, a sighting instrument carried by the limb, and mechanism carried by the limb and coöperating with the frame for moving the limb with respect to said frame and annulus, substantially as set forth.

4. A device for locating a distant point, comprising in combination a frame, an annulus movably carried by said frame and having a scale or graduations thereon, separate adjusting devices for moving the annulus with respect to said frame, an upper limb, an index carried thereby coöperating with the scale on the annulus, a sighting instrument carried by the limb, and mechanism carried by the limb and coöperating with the frame for moving the limb with respect to said frame and annulus, said mechanism being capable of disengagement from said frame, substantially as set forth.

5. A device for locating a distant point, comprising in combination a frame, an annulus movably carried by said frame, means for moving said annulus with respect to the frame, an upper limb movable pivotally with respect to the frame and annulus, a scale carried by the annulus, an index carried by the limb and coöperating with said scale, and a sighting instrument carried by said limb, substantially as set forth.

6. A device for locating a distant point, comprising in combination a frame, an annulus movably carried by the frame, a scale on said annulus, a limb pivotally movable with respect to the annulus and said frame, an index carried by the limb coöperating with said scale, mechanism carried by the limb and coöperating with the frame for moving the annulus relatively to the frame, and a scale carried by said mechanism for effecting a reading in coöperation with the scale on the annulus, substantially as set forth.

7. A device for locating a distant point, comprising in combination a frame, an upper limb movable pivotally with respect to said frame, a sighting instrument carried by the frame, a bracket pivoted to said limb, a worm carried in the bracket and engaging teeth on said frame, whereby said bracket may be swung pivotally to engage and disengage the worm with said teeth, substantially as set forth.

8. A device for locating a distant point, comprising in combination a frame, an upper limb movable pivotally with respect to said frame, a sighting instrument carried by the frame, a bracket pivoted to said limb, a worm carried in the bracket and engaging teeth on said frame, whereby said bracket may be swung pivotally to engage and disengage the worm with said teeth, and a handle for operating said worm, and means for connecting and disconnecting said handle from the worm, substantially as set forth.

9. A device for locating a distant point, comprising in combination a frame, an upper limb movable pivotally with respect to said frame, a sighting instrument carried by the frame, a bracket pivoted to said limb, a worm carried in the bracket and engaging teeth on said frame whereby said bracket may be swung pivotally to engage and disengage the worm with said teeth, a handle for operating said worm, means for connecting and disconnecting said handle from the worm, a scale carried by said handle, and an index coöperating with said scale, substantially as set forth.

10. A device for locating a distant point, comprising in combination a pivotally-mounted limb, a sighting instrument carried by said limb and pivotally movable in a vertical plane, a slide for sustaining the free end of said sighting instrument, a screw for actuating said slide, a disk movable with the screw and provided with a graduated spiral groove, and an index engaging said groove, substantially as set forth.

11. A device for locating a distant point, comprising in combination a pivotally-mounted limb, a sighting instrument carried by said limb and pivotally movable in a vertical plane, a slide for sustaining the free end of said sighting instrument, a screw for actuating said slide, a disk movable with the screw and provided with a graduated spiral groove, an index engaging said groove, and means for compensating for abnormal refraction, substantially as set forth.

12. A device for locating a distant point, comprising in combination a pivotally-mounted limb, a sighting instrument carried by said limb and pivotally movable in a vertical plane, a slide for sustaining the free end of said sighting instrument, a screw for actuating said slide, a disk movable with the screw and provided with a graduated spiral groove, an index engaging said groove, and a flexible support for said index capable of adjustment to compensate for abnormal refraction, substantially as set forth.

13. A device for locating a distant point, comprising in combination a pivotally-mounted supporting-limb turning in a horizontal plane, a telescope pivoted to said limb and movable in a vertical plane, an adjustable support for the free end of said telescope, said support being adjustable in a horizontal plane, substantially as set forth.

14. A device for locating a distant point, comprising in combination a pivotally-mounted supporting-limb turning in a horizontal plane, a telescope pivoted to said limb and movable in a vertical plane, an adjustable support for the free end of said telescope, said support being adjustable in a horizontal plane, and an index with which said support coöperates, substantially as set forth.

15. A device for locating a distant point, comprising in combination a pivotally-mounted supporting-limb turning in a horizontal plane, a telescope pivoted to said limb and movable in a vertical plane, an adjustable support for the free end of said telescope, said support being adjustable in a horizontal plane, and a spirit-level carried by said telescope, substantially as set forth.

16. A device for locating a distant point, comprising in combination a pivoted limb movable in a horizontal plane, a bar pivoted to said limb and movable in a vertical plane, a telescope carried by said bar, a scale on said bar, and a vertically-movable support for the free end of said telescope, said support carrying an index coöperating with said scale, substantially as set forth.

17. A position-determining device comprising a member having a graduated scale and capable of revoluble movement, means for transmitting such movement thereto, a pivotally-mounted member having independent movement coincident with that of a sighting instrument, and a worm feed for moving said pivotally-mounted member relatively to the graduated scale upon said revoluble member, said worm feed having a graduated scale adapted to operate with said worm feed or to have movement independent thereof, substantially as set forth.

18. A position-determining device, comprising a member having a graduated scale and capable of revoluble movement, means for transmitting such movement thereto, a pivotally-mounted member having independent movement coincident with that of a sighting instrument, a feeding-worm normally coöperating with said pivotally-mounted member for moving the latter relatively to the graduated scale on said revoluble member, means for disconnecting the feeding-worm from the pivotally-mounted member, and a scale normally coöperating with the feeding-worm but arranged to have movement independent thereof, substantially as set forth.

19. A position-determining device comprising a member having a graduated scale, a pivotally-mounted member having independent movement, an index controlled by said pivotally-mounted member and coacting with said graduated scale, a sighting instrument carried by said pivotally-mounted member, a screw adjustment intermediate of said instrument and said member for elevating or depressing one end of said instrument, and a graduated scale indicating the degree of such elevation or depression, substantially as set forth.

20. A position-determining device comprising a revoluble member having a graduated scale, a pivotally-mounted member having independent movement, an index carried by said pivotally-mounted member and coacting with said graduated scale, a sighting instrument carried by or connected with said pivotally-mounted member, mechanism intermediate of said instrument and said member for elevating or depressing one end of said instrument, and a disk and index coacting therewith and indicating by scale the range of a distant object seen through said instrument, substantially as set forth.

21. A position-determining device comprising a revoluble member having a graduated scale, a pivotally-mounted member having independent movement, an index whose movement is controlled by said pivotally-mounted member, a sighting instrument supported upon or connected with said pivotally-mounted member, a revoluble disk mounted upon said pivotally-mounted member, mechanism intermediate of said disk and said instrument, whereby the revolution of the former effects the elevation or depression of one end of said instrument, and mechanism coacting with said disk to indicate the range of a distant object seen through said instrument, substantially as set forth.

22. A position-determining device comprising a revoluble member having a graduated scale, a pivotally-mounted member having independent movement, an index whose movement is controlled by said pivotally-mounted member, a sighting instrument supported upon or connected with said pivotally-mounted member, a revoluble disk mounted upon said pivotally-mounted member, means for imparting revoluble movement to said disk, mechanism intermediate of said disk and said instrument whereby the revolution of the former effects the elevation or depression of one end of said instrument, and mechanism coacting with said disk to indicate the range of a distant object seen through said instrument, substantially as set forth.

23. A position-determining device comprising a revoluble member having a graduated scale, a pivotally-mounted member having independent movement, an index whose movement is controlled by said pivotally-mounted member, a sighting instrument supported upon or connected with said pivotally-mounted member, a revoluble disk mounted upon said pivotally-mounted member, said disk having a graduated scale, mechanism intermediate of said disk and said instrument whereby the revolution of the former effects the elevation or depression of one end of said instrument, and mechanism coacting with the graduated scale upon said disk to indicate the range of a distant object, substantially as set forth.

24. A device for locating a distant point, comprising in combination a pivotally-mounted supporting-limb turning in a horizontal plane, a telescope pivoted to said limb and movable in a vertical plane, an adjustable support for the free end of said telescope, said support being adjustable in a horizontal plane, a scale coöperating with said adjustable support, and a spirit-level carried by said telescope, substantially as set forth.

25. In a device for locating a distant point, the combination with an annulus carrying a scale composed of a plurality of contrasting marks, of a pointer coöperating with said scale, mechanism for moving said pointer over the scale, and a scale coöperating with said mechanism and composed of a plurality of contrasting marks corresponding to the scale on the annulus, substantially as set forth.

26. In a device for locating a distant point, the combination with an annulus carrying a scale composed of a plurality of contrasting marks, of a pointer coöperating with said scale, a worm connected to the pointer and engaging said annulus, and a drum rotating with the worm and carrying a scale composed of a plurality of contrasting marks corresponding to the scale on the annulus, substantially as set forth.

This specification signed and witnessed this 24th day of March, 1897.

WILLIAM C. RAFFERTY.

Witnesses:
S. O. EDMONDS,
JNO. R. TAYLOR.